United States Patent
Uselton et al.

[11] Patent Number: 5,211,029
[45] Date of Patent: May 18, 1993

[54] COMBINED MULTI-MODAL AIR CONDITIONING APPARATUS AND NEGATIVE ENERGY STORAGE SYSTEM

[75] Inventors: Robert B. Uselton, Lancaster; William J. Dean, Grapevine; Michael G. Longman, Flower Mound, all of Tex.

[73] Assignee: Lennox Industries Inc., Dallas, Tex.

[21] Appl. No.: 706,057

[22] Filed: May 28, 1991

[51] Int. Cl.⁵ .................... F25D 11/00; F25B 27/00
[52] U.S. Cl. .................... 62/324.5; 62/434; 62/332; 62/59
[58] Field of Search .............. 62/324.5, 324.4, 59, 62/238.7, 238.6, 79, 99, 326, 332, 430, 434

[56] References Cited

U.S. PATENT DOCUMENTS

| | | | |
|---|---|---|---|
| 3,675,441 | 7/1972 | Perez | 62/434 |
| 4,513,574 | 4/1985 | Humphreys et al. | 62/59 |
| 4,545,214 | 10/1985 | Kinoshita | 62/160 |
| 4,727,726 | 3/1988 | Mitani et al. | 62/238.6 |
| 4,735,064 | 4/1988 | Fischer | 62/430 |

Primary Examiner—Henry A. Bennet
Assistant Examiner—William C. Doerrler
Attorney, Agent, or Firm—Allegretti & Witcoff, Ltd.

[57] ABSTRACT

The present combined multi-modal apparatus involves: (a) apparatus for cooling, by means of a refrigerant circulating within coils disposed in a tank a negative heat energy storage material during a first time period; (b) associated apparatus for utilizing that stored negative heat energy during a second time period; and (c) most particularly, a tank by-pass structure for directly connecting a condensing unit and an evaporating unit during a third time period, such as for example when supplemental cooling is required. Specifically, the tank by-pass structure avoids circulation during the third time period of the refrigerant within the conduits or coils disposed within the negative heat energy storage material contained within the tank. Thus, during this third time period, heat is not imparted to the negative heat energy storage material by the circulating refrigerant, the cooled or frozen negative heat energy storage material is not heated or melted by circulating refrigerant, and thus does not have to be recooled or refrozen subsequently for re-storage of energy therewithin for later use in cooling during peak hours (i.e., during the second time period). During a fourth time period, the cooling of both of second and third time periods is carried out simultaneously. Yet further, a heat pump may be operatively connected hereto for providing heat during a heating time period.

15 Claims, 2 Drawing Sheets

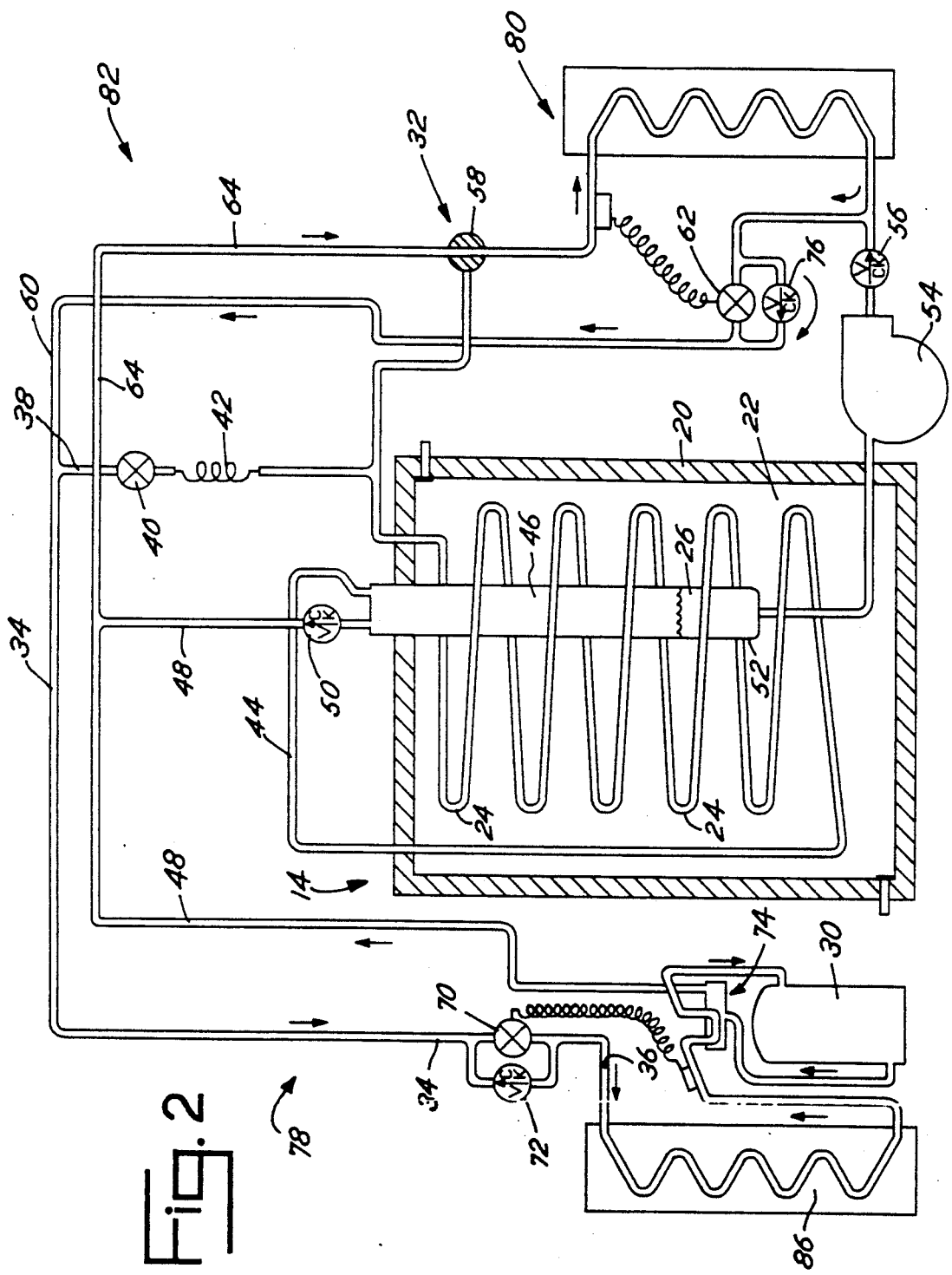

COMBINED MULTI-MODAL AIR CONDITIONING APPARATUS AND NEGATIVE ENERGY STORAGE SYSTEM

BACKGROUND OF THE INVENTION

The present invention relates in general to air conditioning apparatus including associated energy storing systems, and more particularly to an improved apparatus for storing ice or eutectic material (hereinafter sometimes referred to as "negative heat energy storage material"), for supply of stored negative energy during peak electrical demand times, while sequentially providing at a different time period direct air conditioning without circulating the refrigerant liquid into the tank for storing the ice or eutectic material, thereby to avoid unnecessary melting and consequently the necessity for refreezing of the negative heat energy storage material.

In the prior art, certain combined air conditioning apparatus with associated negative energy storage systems have been developed for the purpose of efficiently exploiting the two-tier pricing system utilized by electrical utilities. In particular, one such exemplary apparatus is set forth in U.S. Pat. No. 4,735,064 to Fischer.

By way of background, electrical utilities have developed a two-tier pricing structure which is divided into peak hours and off-peak hours. Peak hours occur when electrical demand is maximized, such as those periods of the day corresponding to the average daily highest temperatures, and which generally relate to some extent to those hours surrounding the afternoon-time period. One important reason for the relatively high extent of electrical demand during the period of the day when the temperatures are the greatest (i.e., at the "peak hours") is because of the utilization of air conditioning systems in a large percentage of commercial and residential buildings. The "off peak" hours occur when electrical demand is minimized. The "off peak" hours correspond generally to the time period around and after the midnight hour, when the demand for cooling, if any, is minimized because of the relative inactivity of persons, and when the utilization of electricity for electrical lighting is likewise minimized for the same reasons.

As a result of the greater demand for electricity during the peak hours of the day, the rate prices for electricity during such peak hours are substantially greater than the rate prices for electricity during the off peak hours.

The amount of electricity utilized at business and residential buildings is substantial during peak hours. In view thereof, it has been proposed (such as for example in U.S. Pat. No. 4,735,064 to Fischer) that it would be optimally advantageous to utilize electrical devices, such as air conditioning compressors, only during off peak times, and to utilize stored energy during the peak times.

These prior art structures are directed to apparatus having a storage tank which is built around cooling coils. The coils contain a refrigerant. A condensing unit is connected to the coils for supplying liquid refrigerant to the coils, which upon expansion freeze or solidify the material in the tank during a first time period which corresponds to the period of off peak electrical demand. The coils are also connected to an evaporating unit which receives cold refrigerant liquid from the coils during a second time period which corresponds to the period of peak electrical demand. In addition, the condensing unit is typically connected to the evaporator unit by means of conduits passing through the tank, and thus for providing refrigerant to the evaporating unit during a third time period, when some cooling may be necessary. This third time period occurs during off peak hours. Energy use and operating cost are reduced by operating to provide cooling in this way during off peak hours.

There have been certain defects and disadvantages associated with these prior art structures and methods. For example, one problem in particular is that there is melting of some of the ice in the tank when the system is operated during the third time period. Yet further, operation has proved to be less than optimally efficient due to low evaporating temperature in the cooling mode and due to low evaporating temperature operation in the ice making mode to re-make the ice which has been melted during the cooling mode operation. Thus, there is an "energy penalty" associated with cooling by the freezing and melting of ice as compared to conventional air conditioning methods involving direct through pumping of refrigerant from a condensing unit to an evaporating unit.

In view of the defects and deficiencies associated with prior art systems, it is an object of the present invention to provide an improved combined multi-modal air conditioning apparatus and negative energy storage system which permits optimally efficient operation by means of by-passing of the tank by the circulating refrigerant when the apparatus is in the direct-cooling mode, thereby to avoid melting the stored negative heat energy storage material, usually comprising ice, which then does not have to be refrozen.

It is another and further material object of the present invention to provide a multi-modal air conditioning apparatus and energy storing system which has improved operating cost efficiency over prior art systems. It is another and further material object of the present invention to provide a multi-modal air conditioning apparatus and energy storing system which, by virtue of the method of by-passing of the tank by the circulating refrigerant, can also be operated as a conventional heat pumping system also. Other objects and advantages of the present invention will be made more apparent hereafter.

SUMMARY OF THE INVENTION

The combined multi-modal air conditioning apparatus and negative energy storage system of the present invention utilizes the type of air conditioning apparatus having at least a condensing unit and evaporating unit. A refrigerant circulates between the condensing unit and the evaporating unit, and may be utilized with split air conditioning equipment or with packaged units, also.

In summary, three different cooling modes are available:

(a) utilizing cooled (or frozen) negative heat energy storage material;

(b) utilizing vapor compression for cooling; and (c) utilizing both of (a) and (b) simultaneously.

An insulated storage tank for disposition of negative heat energy storage material therein surrounds coils disposed therewithin for circulating the refrigerant therethrough. Reference is made to "negative" heat energy storage herein because the material to be stored within the insulated storage tank has had heat energy removed therefrom, and that material is then stored herein for later use. The cooler refrigerant coming from the condensing unit circulates within the coils and cools (or freezes) the negative heat energy storage material during a first (or energy storage) time period which corresponds to off peak hours, and accordingly to off peak electrical rates. During a second time period (or negative energy dissipation time period), which corresponds to on peak hours and peak hourly electrical rates, the refrigerant material disposed within the coils is circulated from the coils to the evaporating unit, by a refrigerant pump, to provide a cooling function to a closed space located in the vicinity of the evaporating unit. The condensing unit is off during this second time period.

The present combined multi-modal apparatus particularly contains tank by-pass means for directly connecting the air conditioning unit and the evaporating unit during a third time period, such as for example when off peak cooling is required. The tank by-pass means avoids circulation during the third time period of the refrigerant through conduits or coils disposed within the negative heat energy storage material contained within the tank. Thus, during this third time period, heat is not imparted to the negative heat energy storage material by the circulating refrigerant. More particularly, the frozen negative heat energy storage material is not melted by circulating refrigerant, and thus does not have to be refrozen subsequently for re-storage of energy therewithin for later use in cooling during peak hours (i.e., during the second time period).

In certain preferred embodiments hereof, the present multi-modal apparatus further includes a condenser flow line which is connected to the condensing unit at one end and has a first branch connected to the coils for directing refrigerant into the coils within the tank. In these embodiments, the first branch has an on/off valve for selective opening at least during the first time period and for selective closing during the third time period. The condenser flow line has a by-pass line connected at one end between the on/off valve and the condensing unit, and the by-pass branch is connected at the other end to the evaporating unit.

Additionally, in certain preferred embodiments hereof, the present multi-modal apparatus further includes a refrigerant selective return means for returning the refrigerant material from the evaporating unit alternatively to the tank, during at least the second time period, or to the condensing unit during the third time period.

Additionally, in certain preferred embodiments hereof, the present multi-modal apparatus includes an undersized condensing unit or a multi-capacity condensing unit to allow more than one rate of cooling capacity. In the third time period, the undersized condensing unit or multi-capacity condensing unit which is operating at a reduced capacity, provides a first and low level of cooling. A second and enhanced level of capacity is achieved by circulating refrigerant through the coils of the negative energy storage system as well as through the condensing unit. This fourth time period also corresponds to the peak period of electrical energy use.

Also, in certain preferred embodiments hereof, the present multi-modal apparatus further includes an expansion valve, check valve, reversing valve and other conventional heat pump controls in the condensing unit and a check valve in parallel with the expansion device in the indoor evaporating unit. In this embodiment, a direct heating mode is possible. The refrigerant selective return means prevent circulation of refrigerant through the tank.

The combined multi-modal air conditioning and negative energy storage system of the present invention will be better understood with regard to the following brief description of the drawing, detailed description of preferred embodiments, appended claims, and accompanying drawing.

BRIEF DESCRIPTION OF THE DRAWING

The combined multi-modal air conditioning apparatus and negative energy storage system of the present invention in two embodiments thereof are set forth in the following drawings in exemplary embodiments, and in which:

FIG. 2 is a schematic diagram of the system hereof including a heat pump outdoor unit, an indoor unit, the negative energy storage tank and the respective conduits and valves disposed therebetween for effecting selective use during various time periods.

DETAILED DESCRIPTION OF PREFERRED EMBODIMENTS

Figure 1:
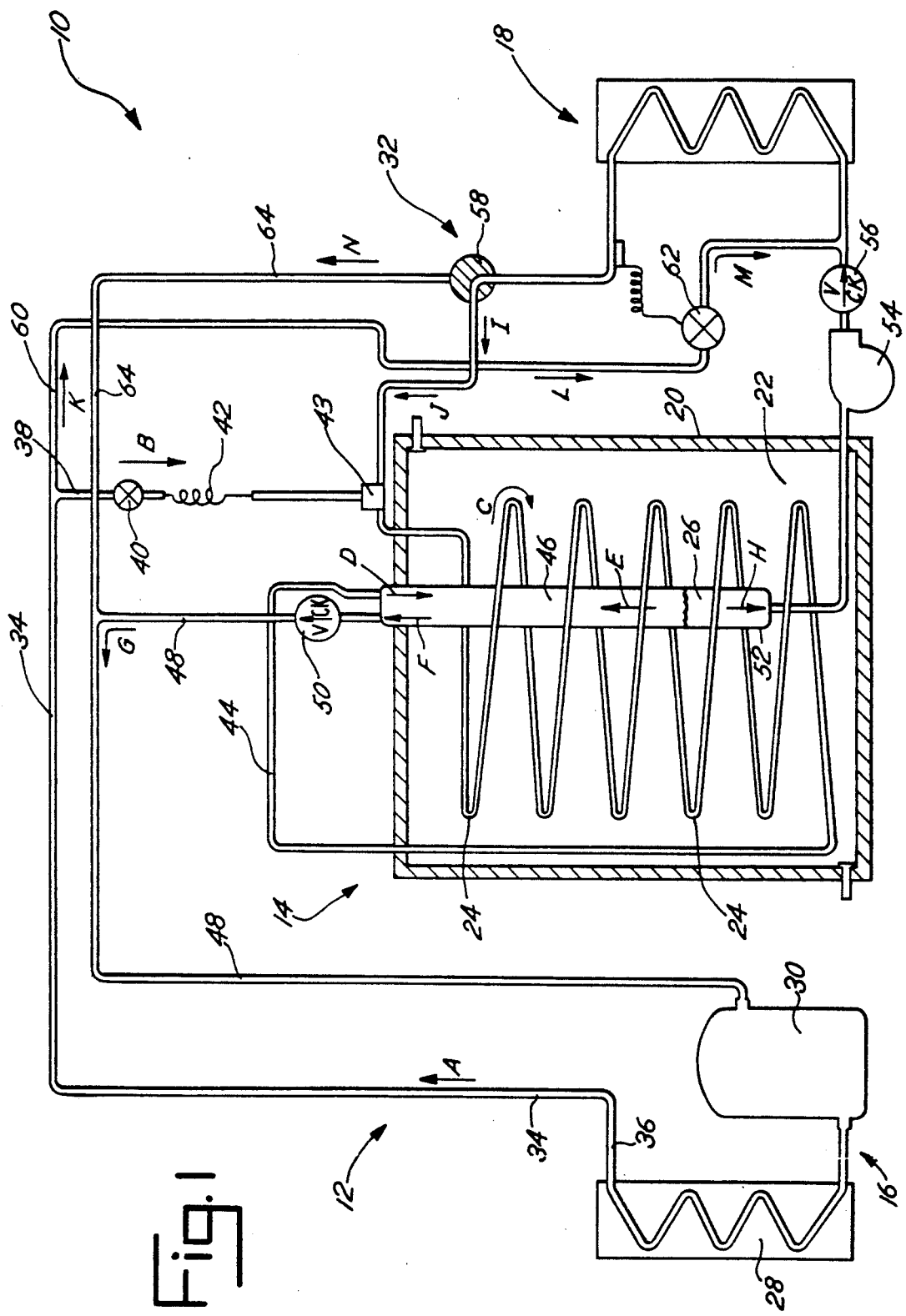
FIG. 1 is a schematic diagram of the system hereof including the condensing unit, the evaporating unit, the negative energy storage tank, and the respective conduits and valves disposed therebetween for effecting selective use during various time periods.

In the combined multi-modal air conditioning apparatus and negative energy storage system of the present invention, an air conditioning apparatus is provided in operative and interactive connection with an energy storage system. The air conditioning apparatus generally includes a condensing unit and an evaporating unit. The negative energy storage system is for negative heat energy storage (i.e., stores a material which has been cooled), and principally includes an insulated tank for disposition of the negative heat energy storage material, comprising for example water, eutectic, or other materials such as a salt solution therein, and coils disposed therewithin for circulating the refrigerant therethrough.

The condensing unit and the insulated tank operate during a first time period, and which corresponds to off peak hours, to cool and preferably to solidify the negative heat energy storage material by circulating cooled refrigerant material through the coils from the condensing unit to and through the coils disposed within the insulated tank.

During the second time period, the negative heat energy stored within the tank is communicated with the evaporating unit to provide cooling to an associated air conditioned space, with the second time period generally corresponding to the period of the day of peak energy usage. Such transfer of negative heat energy occurs by circulating during the second time period the refrigerant between the coils in the tank which are surrounded by cooled or frozen negative heat energy storage materials and the evaporating unit.

In a third time period, tank by-pass means are utilized for directly connecting the condensing unit and the evaporating unit, thus operating as a conventional air conditioning system while simultaneously avoiding the circulation of refrigerant material within conduits or coils disposed within the negative heat energy storage material which is contained in the tank. Thereby, during such third time period, heat is not imparted to the negative heat energy storage material by the refrigerant, and therefore the melting or otherwise heating of the negative heat energy storage material, which would necessitate later refreezing and/or recooling, does not occur.

The above described negative heat storage material disposed in the tank may comprise water, or may comprise a eutectic solution, such as a salt solution of composition known to those of ordinary skill in the art. The refrigerant utilized may comprise a fluorocarbon, and more particularly may be directed to refrigerant-22 in certain preferred embodiments, although other functional materials are known to those skilled in the art.

More specifically, the above combined multi-modal apparatus includes a condenser flow line connected to the condensing unit at one end thereof and has in preferred embodiments, a first branch thereof connected to the coils for directing the refrigerant into the coils within the tank. In such embodiments, this first branch has an on/off valve for selectively opening at least during the first time period, and for selectively closing during the third time period, when the coils within the tank are not in use for providing refrigerant for cooling the closed space associated with the evaporating unit. Additionally, the condenser flow line may have preferably a by-pass line connected at one end between the on/off valve and the condensing unit, and the by-pass branch may be connected at the other end to the evaporating unit.

In addition to the foregoing features, the present invention also permits the use of components smaller in size and greater in efficiency. In these and other preferred embodiments, preferably a thermostatic expansion valve (TVX) is disposed thereon upstream of the evaporating unit for use in maintaining superheat for the compressor. Also, in these and other preferred embodiments, the apparatus further includes refrigerant selective return means for returning the refrigerant material from the evaporating unit alternatively to the tank, during at least the second time period, or to the condensing unit during the third time period.

It has been noted that two-speed condensing units operate for many hours during a cooling season on the lower speed. This is because, for most of the cooling season, the building cooling load is significantly less than the maximum capacity of the air-conditioner. The apparatus and method utilized in the prior art conventionally include a nominally sized condensing unit. In another embodiment, the present invention preferably utilizes an undersized condensing unit to provide a direct cooling function at reduced capacity and enhanced efficiency. For example, a two-stage room thermostat would activate a direct vapor compression cooling mode (third time period) when a first stage of demand was sensed. The undersized condensing unit would provide a level of cooling which would either be able to satisfy the thermostat or not. A reduced indoor blower speed would likewise be preferable for the direct cooling mode in order to retain latent capacity when using an undersized condensing unit. If the second stage of demand in the thermostat became activated, this would indicate that the direct mode of operation was inadequate to meet the load, and the system would then go to a cooling mode (fourth time period) which uses ice to supplement the capacity of the vapor compression system. Cooling capacity would be greatly increased without a corresponding increase in instantaneous power.

Although several embodiments hereof will accomplish a direct cooling mode which allows higher energy efficiency operation to be achieved, the drawing FIG. 1 hereof depicts one exemplary schematic arrangement of a system for operation in the ice-making mode, the various modes where water is used as the negative heat energy storage material which may be designated respectively as the ice melting mode, the direct mode, and the ice-assisted direct mode associated respectively with time periods one, two, three and four.

Referring now to FIG. 1 in particular, wherein one exemplary embodiment of the combined multi-modal air conditioning apparatus and energy storage system generally 10 of the present invention is schematically depicted, an air conditioning apparatus generally 12 is provided in connection with a negative energy storage system generally 14. Air conditioning apparatus 12 includes a condensing unit generally 16 and an evaporating unit generally 18. Negative energy storage system 14 principally includes an insulated tank 20 for disposition of negative heat energy storage material 22 therein and coils 24 disposed therewithin for circulating the refrigerant 26 therethrough. Condensing unit 16 includes condenser 28 and compressor 30.

Condensing unit 16 and insulated tank 20 operate during a first time period, which corresponds to off peak hours, to cool and preferably to freeze the negative heat energy storage material 22 by circulating cooled refrigerant material 26 through coils 24 from condenser 28 of condensing unit 16 to and through coils 24 disposed within insulated tank 20.

During the second time period, the negative heat energy stored within tank 20 is communicated with evaporating unit 18 to provide cooling to an associated closed air conditioned space, generally corresponding to peak energy usage. As set forth, such transfer of negative heat energy occurs by circulating refrigerant 26 from coils 24 in tank 20 to evaporating unit 18 during the second time period.

As discussed, supra, in the third time period, tank by-pass means generally 32 are utilized for directly connecting condensing unit 16 and evaporating unit 18 during the third time period, while simultaneously avoiding the circulation of refrigerant material 26 within coils 24 disposed within negative heat energy storage material 22 which is contained within tank 20. Thereby, during such third time period, heat is not imparted to the cooled/frozen negative heat energy storage material 22 by circulating refrigerant 26, and therefore the melting of the frozen negative heat energy storage material 22, which would have to be later refrozen and/or recooled, does not occur.

Yet more specifically, the above combined multi-modal apparatus 10 includes a condenser flow line 34 connected to condenser 28 of condensing unit 16 at one end 36 thereof and pumping condensed refrigerant material 26 in the direction of Arrow A towards, to and through a first branch 38 thereof connected to coils 24 for directing the refrigerant into coils 24 within tank 20, as shown at Arrows B and C. First branch 38 has an on/off valve 40 which may preferably comprise a solenoid valve for selectively opening at least during the first time period, and for selectively closing during the third time period, when coils 24 within tank 20 are not in use for cooling the space associated with evaporating unit 18. On/off valve 40 has an expansion device 42 disposed downstream thereof in first branch 38 of condenser flow line 34.

During the first time period, refrigerant material 26 is directed upwardly in tank 20 within accumulator return line 44 to accumulator 46, as shown at Arrow D. Thereafter, the accumulated refrigerant material 26 is returned to compressor 30 through compressor return line 48, as shown at Arrows E, F and G. Check valve 50 prevents backward flow into accumulator 46.

During the second time period, when it is desired to cool the air conditioned space associated with evaporating unit 18 by means of negative heat energy stored within tank 20, refrigerant 26 is drawn from accumulator 46 at the bottom 52 thereof (see Arrow H) for supply at liquid pump 54 and through check valve 56 to evaporating unit 18. Thereafter, the "spent" (i.e., heated) refrigerant 26 is returned to coils 24 for re-cooling by means of 3-way valve 58 (see Arrows I and J).

During the third time period, refrigerant 26 is pumped from condenser 28, through condenser flow line 34 to tank by-pass line 60 (see Arrow K), as on/off valve 40 is in the closed position to prevent refrigerant 26 from flowing downwardly into coils 24. Thereafter, refrigerant 26 flows through thermostatic expansion valve 62 of the type known in the art (see Arrows L and M) into evaporating unit 18, and returns to compressor 30 of condensing unit 16 through 3-way valve 58, sequentially by means of by-pass return line 64 (see Arrow N) and then compressor return line or suction line 48. Accordingly, when operated in the mode corresponding to the third time period, refrigerant 26 does not circulate within any conduits or coils, but rather by-passes tank 20, thereby to avoid providing heat energy to negative heat energy storage material 22 within tank 20.

During the fourth time period, operation is similar to the third time period, except: solenoid valve 40 is open, pump 54 is on and 3-way valve 58 returns vapor from the evaporator to the tank 20 (see Arrow I). Heat energy absorbed at the evaporator 18 is rejected to the negative energy storage material and to the outside air via the condensing unit 16.

In addition to those embodiments depicted in the Figs. hereof, certain modifications are within the scope hereof. Specifically, and among the several variations hereof which may be made without departing from the scope hereof include means for circulating liquid refrigerant through the evaporator TXV in all cooling modes, and wherein the outlet of the liquid pump ties into the liquid upstream of the expansion device. Moreover, disposition of a suction/liquid heat exchanger in the accumulator to getting to steady-state apparition when switching between modes is indicated in various alternative embodiments.

Referring now to FIG. 2 in particular, wherein an exemplary embodiment of the combined multi-modal air conditioning apparatus and energy storage system generally 82 of the present invention is schematically depicted, a heat pump apparatus generally 84 is provided in connection with a negative energy storage system generally 14. Heat pump apparatus 84 includes a heat pump outdoor unit generally 78 and an indoor heat exchanger 80. The negative energy storage system 14 is as described in FIG. 1. Heat pump outdoor unit 78 includes outdoor heat exchanger 86, compressor 30, reversing valve 74, expansion valve 70 and check valve 72.

Expansion valve 62 associated with the indoor heat exchanger 80 has a check valve 76 for by-passing refrigerant while in heating mode.

The modes described in FIG. 1 are all operable with this configuration. In addition, a conventional heat pump operating cycle is operable by having solenoid valve 40 closed and 3-way valve 58 positioned to circulate compressor discharge gas to the indoor heat exchanger, 80.

The basic and novel characteristics of the improved methods and apparatus of the present invention will be readily understood from the foregoing disclosure by those skilled in the art. It will become readily apparent that various changes and modifications may be made in the form, construction and arrangement of the improved apparatus of the present invention, and in the steps of the inventive methods hereof, which various respective inventions are as set forth hereinabove without departing from the spirit and scope of such inventions. Accordingly, the preferred and alternative embodiments of the present invention set forth hereinabove are not intended to limit such spirit and scope in any way.

What is claimed is:

1. In a combined multi-modal air conditioning apparatus and negative energy storage system, the air conditioning apparatus having a condensing unit, an evaporating unit, and including a refrigerant for circulation therebetween, the negative energy storage system having a tank for disposition of negative heat energy storage material therein, and refrigerant conduits disposed therewithin for circulating the refrigerant therethrough alternatively to cool the negative heat energy storage material during a first time period, and to impart heat energy to the negative heat energy storage material during a second time period for time-shifted air conditioning use, the improvement comprising:

tank by-pass means for directly connecting said condensing unit and said evaporating unit during a third time period including valve means for isolating the tank from the condensing unit and evaporating unit for avoidance of circulation during the third time period of the refrigerant within the refrigerant conduits disposed within the negative heat energy storage material contained within said tank, whereby, during said third time period, heat energy is not imparted to said negative heat energy storage material by said circulating refrigerant.

2. The improvement of claim 1 wherein said negative heat energy storage material disposed in said tank comprises water.

3. The improvement of claim 1 wherein said negative heat energy storage material disposed in said tank comprises a salt solution.

4. The improvement of claim 1 wherein said refrigerant comprises a fluorocarbon.

5. The improvement of claim 4 wherein said fluorocarbon comprises Refrigerant-22.

6. The improvement of claim 1 wherein said combined apparatus includes a condenser flow line connected to said condensing unit at one end thereof and having a first branch connected to said coils for directing said refrigerant into said coils within said tank; said first branch having an on/off valve for selective opening at least during the first time period and for selective closing during the third time period; said condenser flow line having a by-pass line connected thereto at one end between said on/off valve and said condensing unit, said by-pass branch connected at the other end thereof to said evaporating unit.

7. The improvement of claim 6 wherein said by-pass line has a thermostatic expansion valve disposed thereon upstream of said evaporating unit.

8. The improvement of claim 6 further comprising refrigerant selective return means for returning refrigerant from said evaporating unit alternatively to said tank during at least said second time period, or to said condensing unit during said third time period.

9. The improvement of claim 8 wherein said refrigerant selective return means includes means for returning refrigerant to said tank during each of said first and said second time periods.

10. The improvement of claim 8 wherein said refrigerant selective return means includes a three-way valve disposed on conduits communicating respectively between said evaporating unit and selectively between said tank during at least said second time period or said condensing unit during said third time period.

11. The improvement of claim 1 wherein the refrigerant conduits disposed within the tank comprise coils.

12. The improvement of claim 1 wherein said refrigerant selective return means includes a pair of solenoid valves disposed on conduits respectively communicating between said evaporating unit and selectively between said tank during at least said second time period or said condensing unit during said third time period.

13. The improvement of claim 1 further comprising cooling supplementation means for circulating refrigerant both through the refrigerant conduits disposed within the tank and simultaneously through the condensing unit, and for providing an enhanced level of cooling during a fourth time period.

14. The improvement of claim 1 further comprising heat pump tank by-pass means for by-passing circulating refrigerant to avoid transportation thereof into the tank, when in the heating mode.

15. The improvement of claim 1 wherein said air conditioning apparatus includes reversing valve means whereby the air conditioning and negative energy storage system is operable for use as a heat pump.

* * * * *